US011935361B2

(12) United States Patent
Chan et al.

(10) Patent No.: US 11,935,361 B2
(45) Date of Patent: Mar. 19, 2024

(54) GAMING DEVICE WITH PRIZE VALUE SYMBOL REMOVAL

(71) Applicant: Aristocrat Technologies Australia PTY Limited, North Ryde (AU)

(72) Inventors: Matthew Chan, East Killara (AU); Blake Davis, Macquarie Park (AU); Igor Suslik, St. Ives (AU); Xin Liu, Denistone West (AU); James Loader, Springfield (AU); Rahul Ahuja, Ryde (AU); Luke Ireland, Denistone (AU)

(73) Assignee: Aristocrat Technologies Australia PTY Limited, North Ryde (AU)

( * ) Notice: Subject to any disclaimer, the term of this patent is extended or adjusted under 35 U.S.C. 154(b) by 0 days.

(21) Appl. No.: 17/401,226

(22) Filed: Aug. 12, 2021

(65) Prior Publication Data

US 2022/0051519 A1 Feb. 17, 2022

(30) Foreign Application Priority Data

Aug. 13, 2020 (AU) ................................ 2020902881
Sep. 28, 2020 (AU) ................................ 2020244402

(51) Int. Cl.
*G07F 17/00* (2006.01)
*G07F 17/32* (2006.01)
*G07F 17/34* (2006.01)

(52) U.S. Cl.
CPC ...... *G07F 17/3267* (2013.01); *G07F 17/3213* (2013.01); *G07F 17/3244* (2013.01); *G07F 17/34* (2013.01)

(58) Field of Classification Search
None
See application file for complete search history.

(56) References Cited

U.S. PATENT DOCUMENTS 5,851,148 A 12/1998 Brune
7,192,347 B1 3/2007 Marks
(Continued)

FOREIGN PATENT DOCUMENTS

AU 2018214061 2/2020

OTHER PUBLICATIONS

Bally, "Hexagems family", https://www.youtube.com/watch?v=YEGmWiQuAKc, G2E 2018.
(Continued)

*Primary Examiner* — James S. McClellan
*Assistant Examiner* — Jeffrey K Wong
(74) *Attorney, Agent, or Firm* — Brownstein Hyatt Farber Schreck, LLP

(57) ABSTRACT

A gaming device comprises a display, a processor, and a memory storing (a) reel strip data defining a set of reel strips, each reel of the set of reel strips comprising prize value symbols and non-prize value symbols, wherein at least one reel strip of the set of reel strips comprises a designated symbol and (b) instructions. When the instructions are when executed by the processor, cause the processor to, in each of a series of game instances, control the display to display a plurality of symbol positions including by displaying any prize value symbols held from a prior game instance, select a symbol from the set of reel strips for each symbol position not occupied by a held prize value symbol, control the display to display the newly selected symbols at their respective symbol positions in conjunction with any held prize value symbols, and upon the displayed symbols including the designated symbol, modify display of the designated symbol to be a new prize value symbol representing the sum of currently displayed prize symbols and to be held for at least a next game instance, and remove each other prize value symbol from the display to thereby enable
(Continued)

symbols to be selected for the symbol positions at which they were displayed in the next game instance. The instructions cause the processor to award, at the end of the series of game instances, at least the prize values represented by each designated symbol.

20 Claims, 12 Drawing Sheets

(56) References Cited

U.S. PATENT DOCUMENTS

| | | | | |
|---|---|---|---|---|
| 9,275,523 | B1 | 3/2016 | Hughes | |
| 10,424,149 | B1 | 9/2019 | Halvorson | |
| 11,335,168 | B2 | 5/2022 | Suda | |
| 2003/0222402 | A1* | 12/2003 | Olive | G07F 17/3267 463/20 |
| 2004/0048646 | A1 | 3/2004 | Visocnik | |
| 2004/0082384 | A1* | 4/2004 | Walker | G07F 17/3239 463/40 |
| 2004/0266518 | A1* | 12/2004 | Gauselmann | G07F 17/3211 463/20 |
| 2005/0055113 | A1 | 3/2005 | Gauselmann | |
| 2005/0239538 | A1* | 10/2005 | Dixon | G07F 17/34 463/20 |
| 2006/0148562 | A1* | 7/2006 | Walker | G07F 17/32 463/30 |
| 2009/0075722 | A1 | 3/2009 | Louie | |
| 2010/0120507 | A1 | 5/2010 | Rodgers | |
| 2012/0172106 | A1 | 7/2012 | Caputo | |
| 2012/0322532 | A1 | 12/2012 | Nauman | |
| 2013/0065663 | A1 | 3/2013 | Johnson | |
| 2015/0356833 | A1 | 12/2015 | Aoki | |
| 2015/0379809 | A1 | 12/2015 | Clarebrough | |
| 2017/0124805 | A1 | 5/2017 | Prabhu | |
| 2017/0186267 | A1 | 6/2017 | Prabhu | |
| 2017/0372558 | A1 | 12/2017 | You | |
| 2019/0102992 | A1* | 4/2019 | You | G07F 17/3258 |
| 2019/0295377 | A1 | 9/2019 | Suda | |
| 2019/0371117 | A1 | 12/2019 | Hiten | |
| 2020/0111291 | A1* | 4/2020 | Pariseau | G07F 17/34 |
| 2021/0056810 | A1 | 2/2021 | La Guardia | |
| 2021/0065518 | A1 | 3/2021 | Graboyes | |
| 2021/0241572 | A1 | 8/2021 | Marks | |
| 2021/0264741 | A1* | 8/2021 | Hufnagl-Abraham | G07F 17/3213 |
| 2022/0005317 | A1 | 1/2022 | Delekta | |

OTHER PUBLICATIONS

Sci Games, "Happy Chance/Jin Ji Bao Xi", https://www.youtube.com/watch?v=u7GCQx1J6A0, circa G2E 2018.

Office Action (Non-Final Rejection) dated Aug. 4, 2022 for U.S. Appl. No. 17/401,247 (pp. 1-14).

Office Action (Notice of Allowance and Fees Due (PTOL-85)) dated Nov. 15, 2022 for U.S. Appl. No. 17/401,247 (pp. 1-8).

Office Action (Notice of Allowance and Fees Due (PTOL-85)) dated May 25, 2023 for U.S. Appl. No. 17/401,241 (pp. 1-5).

Office Action (Non-Final Rejection) dated Apr. 11, 2023 for U.S. Appl. No. 17/401,241 (pp. 1-13).

Office Action (Non-Final Rejection) dated Sep. 14, 2023 for U.S. Appl. No. 18/079,752 (pp. 1-16).

* cited by examiner

300

| | REEL STRIP POSITION | REEL 1 (341) | REEL 2 (342) | REEL 3 (343) | REEL 4 (344) | REEL 5 (345) |
|---|---|---|---|---|---|---|
| 301 | 1 | COR | 10 | Pic 3 | COR | Pic 1 |
| 302 | 2 | K | Q | K | COR | 10 |
| 303 | 3 | J | COR | 10 | COR | A |
| 304 | 4 | Scat | Pic 1 | Pic 2 | Scat | Wild |
| 305 | 5 | Q | A | Q | Pic 2 | Pic 2 |
| 306 | 6 | 10 | Pic 2 | COR | J | A |
| 307 | 7 | COR | Pic 4 | COR | Pic 1 | Q |
| 308 | 8 | COR | J | Wild | K | Pic 3 |
| 309 | 9 | A | Q | 10 | Q | 9 |
| 310 | 10 | 9 | A | Pic 1 | K | J |
| 311 | 11 | Pic 2 (351) | Pic 3 | 9 | Pic 4 | COR |
| 312 | 12 | 10 (352) | 9 | Pic 3 | Pic 1 | COR |
| 313 | 13 | Pic 1 (353) | COR | A | Q | COR |
| 314 | 14 | Pic 3 | COR | Q | Pic 4 | Pic 4 |
| 315 | 15 | K | Scat | COR | Pic 2 | 9 |
| 316 | 16 | K | 10 | COR | 9 | Scat |
| 317 | 17 | J | Wild | COR | A | K |
| 318 | 18 | COR | Pic 2 | Scat | COR | Pic 1 |
| 319 | 19 | COR | Q | Pic 2 | 10 | COR |
| 320 | 20 | COR | Q | J | K | COR |
| 321 | 21 | 10 | Pic 3 | Pic 3 | Pic 3 | K |
| 322 | 22 | J | J | Pic 4 | Pic 3 | Pic 2 |
| 323 | 23 | Pic 3 | K | K | 10 | Q |
| 324 | 24 | 9 | 9 | 10 | J | K |
| 325 | 25 | Pic 4 | COR | 9 | Pic 1 | Pic 3 |
| 326 | 26 | A | COR | COR | COR | Pic 4 |
| 327 | 27 | 10 | COR | Q | COR | Pic 4 |
| 328 | 28 | Pic 4 | K | Pic 2 | Wild (331) | 10 |
| 329 | 29 | 9 | 10 | J | Q | COR |
| 330 | 30 | Q | Q | Pic 4 | K | J |

FIG. 3

GAMING DEVICE WITH PRIZE VALUE SYMBOL REMOVAL

CROSS-REFERENCE TO RELATED APPLICATIONS

This application claims priority under 35 U.S.C. § 119(a) to Australian Provisional Patent Application No. 2020902881, filed Aug. 13, 2020, and to Australian Patent Application No. 2020244402, filed Sep. 28, 2020, both of which are incorporated herein as if set forth in their entireties.

FIELD

The present application relates to a gaming device with prize value symbol removal.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

SUMMARY

Some example embodiments relate to a gaming device, a method of operating a gaming device and a system where prize value symbols (e.g. symbols with credit values) are removed when a removal condition is satisfied after the prize value symbols have been held for at least one game instance in a manner that enables the prize values to be awarded and which makes available additional symbol positions for selection of prize value symbols in subsequent game instances.

Other example embodiments relate to a gaming device, a method of operating a gaming device and a system where prize value symbols (e.g. symbols with credit values) are removed when a designated symbol is selected, their prize values are transferred to the designated symbol which enables the prize values to be awarded and which makes available additional symbol positions for selection of prize value symbols in subsequent game instances.

Other example embodiments relate to a gaming device, a method of operating a gaming device and a system where prize value symbols (e.g. symbols with credit values) are removed when a designated column of symbol positions is filled with prize value symbols. An award is made of the prize values and their removal makes available additional symbol positions for selection of prize value symbols in subsequent game instances.

An example embodiment provides a gaming device comprising a display, a processor, and a memory storing (a) reel strip data defining a set of reel strips, each reel of the set of reel strips comprising prize value symbols and non-prize value symbols, wherein at least one reel strip of the set of reel strips comprises a designated symbol and (b) instructions. When the instructions are when executed by the processor, cause the processor to, in each of a series of game instances, control the display to display a plurality of symbol positions including by displaying any prize value symbols held from a prior game instance, select a symbol from the set of reel strips for each symbol position not occupied by a held prize value symbol, control the display to display the newly selected symbols at their respective symbol positions in conjunction with any held prize value symbols, and upon the displayed symbols including the designated symbol, modify display of the designated symbol to be a new prize value symbol representing the sum of currently displayed prize symbols and to be held for at least a next game instance, and remove each other prize value symbol from the display to thereby enable symbols to be selected for the symbol positions at which they were displayed in the next game instance. The instructions cause the processor to award, at the end of the series of game instances, at least the prize values represented by each designated symbol.

Another example embodiment provides a method of operating a gaming device comprising a display, a processor, and a memory storing (a) reel strip data defining a set of reel strips, each reel of the set of reel strips comprising prize value symbols and non-prize value symbols, wherein at least one reel strip of the set of reel strips comprises a designated symbol. The method comprises in each of a series of game instances controlling the display to display a plurality of symbol positions including by displaying any prize value symbols held from a prior game instance, selecting a symbol from the set of reel strips for each symbol position not occupied by a held prize value symbol, controlling the display to display the newly selected symbols at their respective symbol positions in conjunction with any held prize value symbols, and upon the displayed symbols including the designated symbol, modifying display of the designated symbol to be a new prize value symbol representing the sum of currently displayed prize symbols and to be held for at least a next game instance, and removing each prize value symbol from the display to thereby enable symbols to be selected for the symbol positions at which they were displayed in the next game instance. The method also involves awarding at the end of the series of game instances, at least the prize values represented by each designated symbol.

Another example embodiment provides a system comprising one or more processors, and at least one memory storing (a) reel strip data defining a set of reel strips, each reel of the set of reel strips comprising prize value symbols and non-prize value symbols, wherein at least one reel strip of the set of reel strips comprises a designated symbol and (b) instructions. When executed by the one or more processors, the instructions cause the one or more processors to, in each of a series of game instances, control a display to display a plurality of symbol positions including by displaying any prize value symbols held from a prior game instance, select a symbol from the set of reel strips for each symbol position not occupied by a held prize value symbol, control the display to display the newly selected symbols at their respective symbol positions in conjunction with any held prize value symbols, and upon the displayed symbols including the designated symbol, modify display of the designated symbol to be a new prize value symbol representing the sum of currently displayed prize symbols and to be held for at least a next game instance, and remove each other prize value symbol from the display to thereby enable symbols to be selected for the symbol positions at which they were displayed in the next game instance. The instructions cause the one or more processors to award, at the end of the series of game instances, at least the prize values represented by each designated symbol.

BRIEF DESCRIPTION OF THE DRAWINGS

FIG. 3 illustrates an example reel strip layout.

DETAILED DESCRIPTION

Embodiments described herein take the form of electronic gaming machines ("EGMs") to either pay a jackpot to a player or increment the jackpot based on a number of prize symbols shown on a display of the EGM during a single play. Generally, if the number of prize symbols equals or exceeds a threshold, the jackpot is paid to the player. Conversely, if the number of symbols is below the threshold, then the jackpot is incremented and the prize symbols may increase in value for future games, free games, or the like.

In some embodiments, the value of the prize symbols increases by summing a value of all prize symbols shown on the display during a non-jackpot-winning play and assigning that summed value to a single prize symbol. The new value (e.g., the summed value) may be used for the prize symbol in future spins or other iterations of a game, thus potentially increasing a payout to a player that did not win the jackpot. This, in turn, may increase engagement with the EGM as a user becomes more invested in his or her play. Further, the value of the prize symbols, way in which they are combined (e.g., summing, multiplying, in proportion to a value, fractionally, or the like), number of prize symbols on a particular reel, placement of prize symbols on one or more reels (whether relative to other symbols or not), probability of generating or displaying a prize symbol, and so on may be controlled or selected in order to maintain, increase, or decrease either or both of a return to player ("RTP") or volatility.

Additionally, by establishing a threshold number of prize symbols at or above which a jackpot is awarded while below (or, in some embodiments, at) which the prize symbol value is increased, the volatility and RTP of the EGM may be carefully controlled. This may permit the EGM to operate within defined parameters across a given time, thus complying with local laws and/or regulations, as well as ensuring a relatively steady and pleasurable experience for a player. Certain embodiments may use physical or virtual/electronic reel strips that have a given configuration of symbols (including prize symbols) that are designed to yield, over time, a given RTP and/or volatility. Other embodiments may determine a value, symbol, or the like for each position on a grid or matrix shown on the display separately, while selecting each value or symbol for each position from a pool. Each position may have a separate pool or may have the same pool, and the pools may include sets of symbols that are chosen to coordinate with the pools for adjacent (e.g., potentially matching) positions in order to control, limit, or otherwise bound either or both of volatility and RTP.

Figure 1:
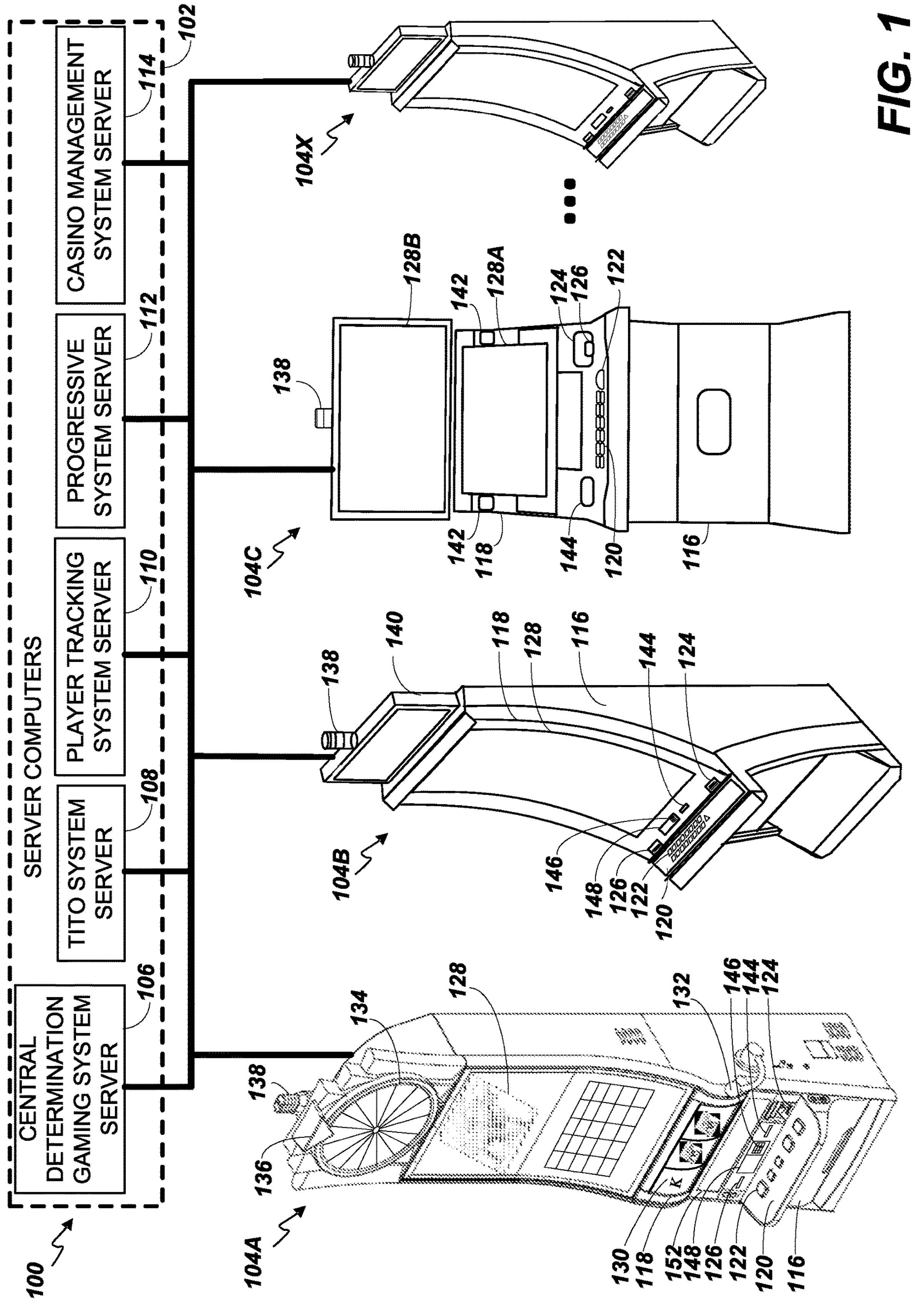
FIG. 1 is an exemplary diagram showing several EGMs networked with various gaming related servers.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Realm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
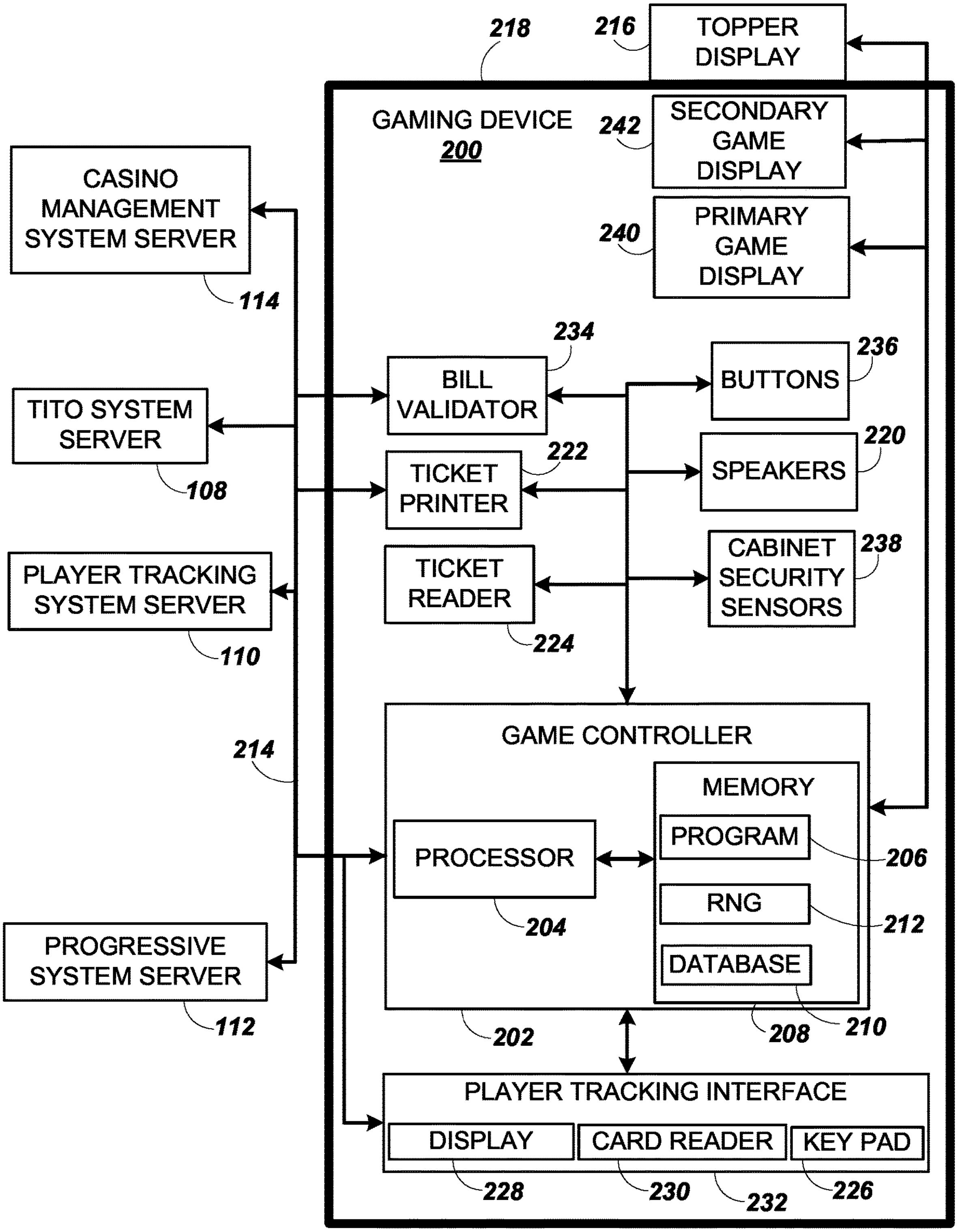
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat®

Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

Figure 5:
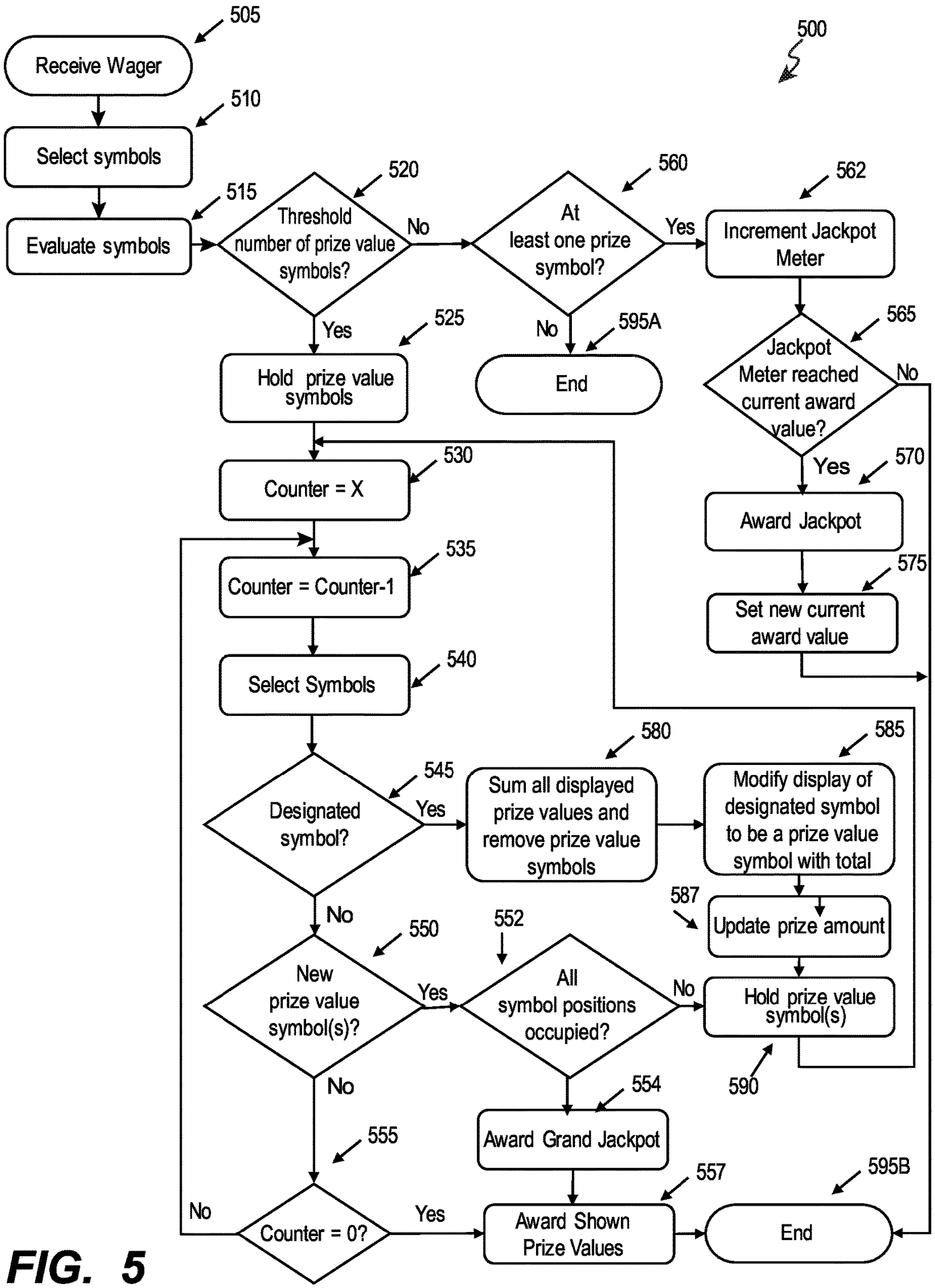
FIG. 5 is a flow chart of a method of operating a gaming device.

FIG. 5 is a flowchart 500 of a method of operating a gaming device 200 of an embodiment. At step 505, the processor 204 receives a wager. For example, input using one of the input devices described above.

Figure 4:
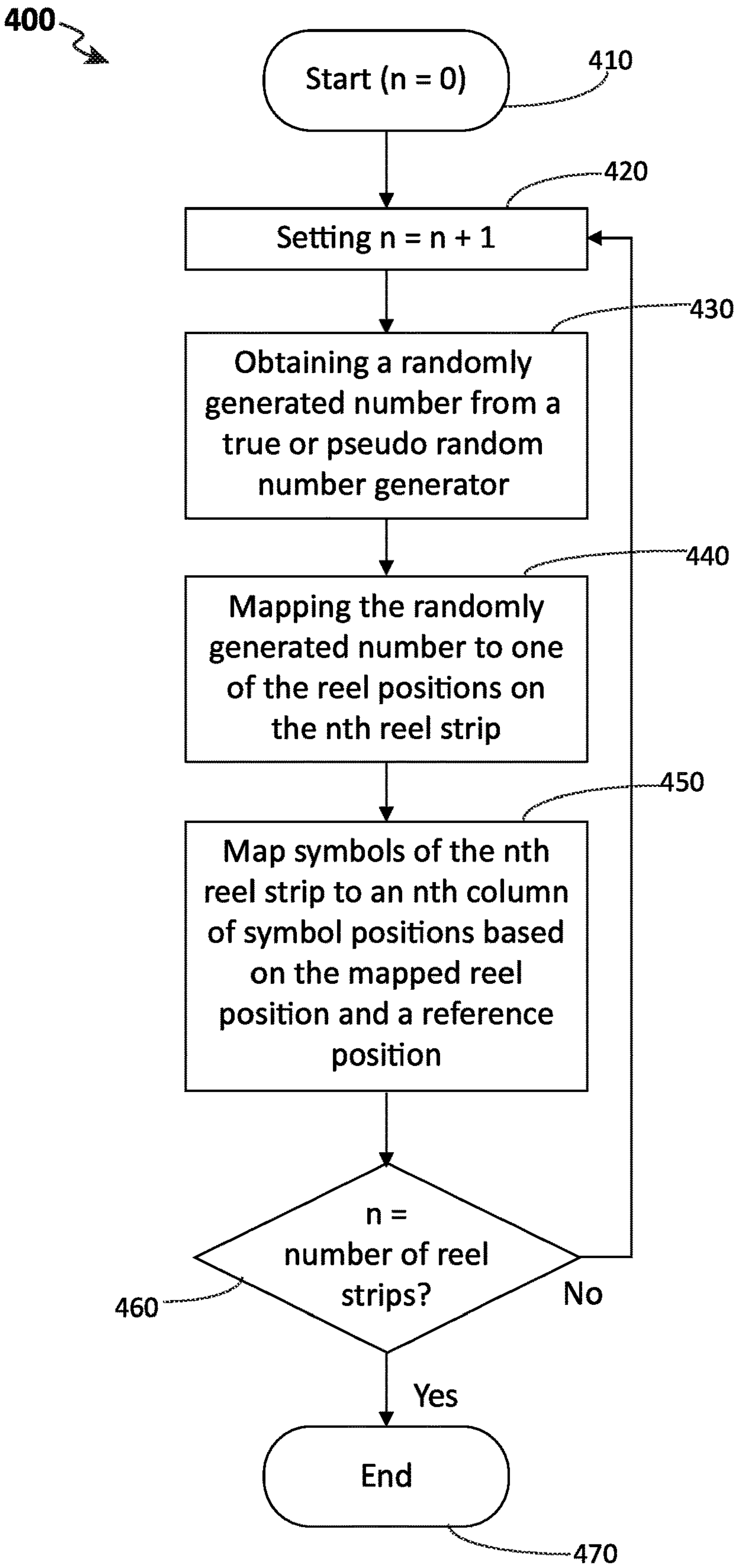
FIG. 4 is a flow chart of a symbol selection method.

At step 510, the processor 204 selects symbols for a base game instance. An example of a symbol selection process is illustrated by FIGS. 3 and 4.

FIG. 3 illustrates an example of a set 300 of five reel strips 341, 342, 343, 344, 345. In the example, each reel strip has thirty reel strip positions 301-330. Each reel strip position of each reel has a symbol. For example, a "Wild" symbol 331 occupies the twenty-eighth reel strip position 328 of the fourth reel 344. Other reels strips to those illustrated in FIG. 3 can be used, for example, reel strips where two or more wild symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

In this example, each of the reel strips has prize value symbols (in this example, the COR or "Cash on Reels" symbols) and non-prize value symbols (that is, the other symbols such as A, K, Q, J, etc.). In an example, the prize value symbols are configured in each game instance by assigning prize values from a weighted table. In an example, the prize values are credit values but in other examples, the prize values may be currency values or the names of prizes, e.g. a mini bonus or a major jackpot. In other example, the prize values are fixed such that they don't need to be configured. In other examples, the prize values may depend on a state of operation of the gaming device 200 which may include outcomes of past game instances. In some examples, an amount wagered may affect the prize values.

Figure 16:
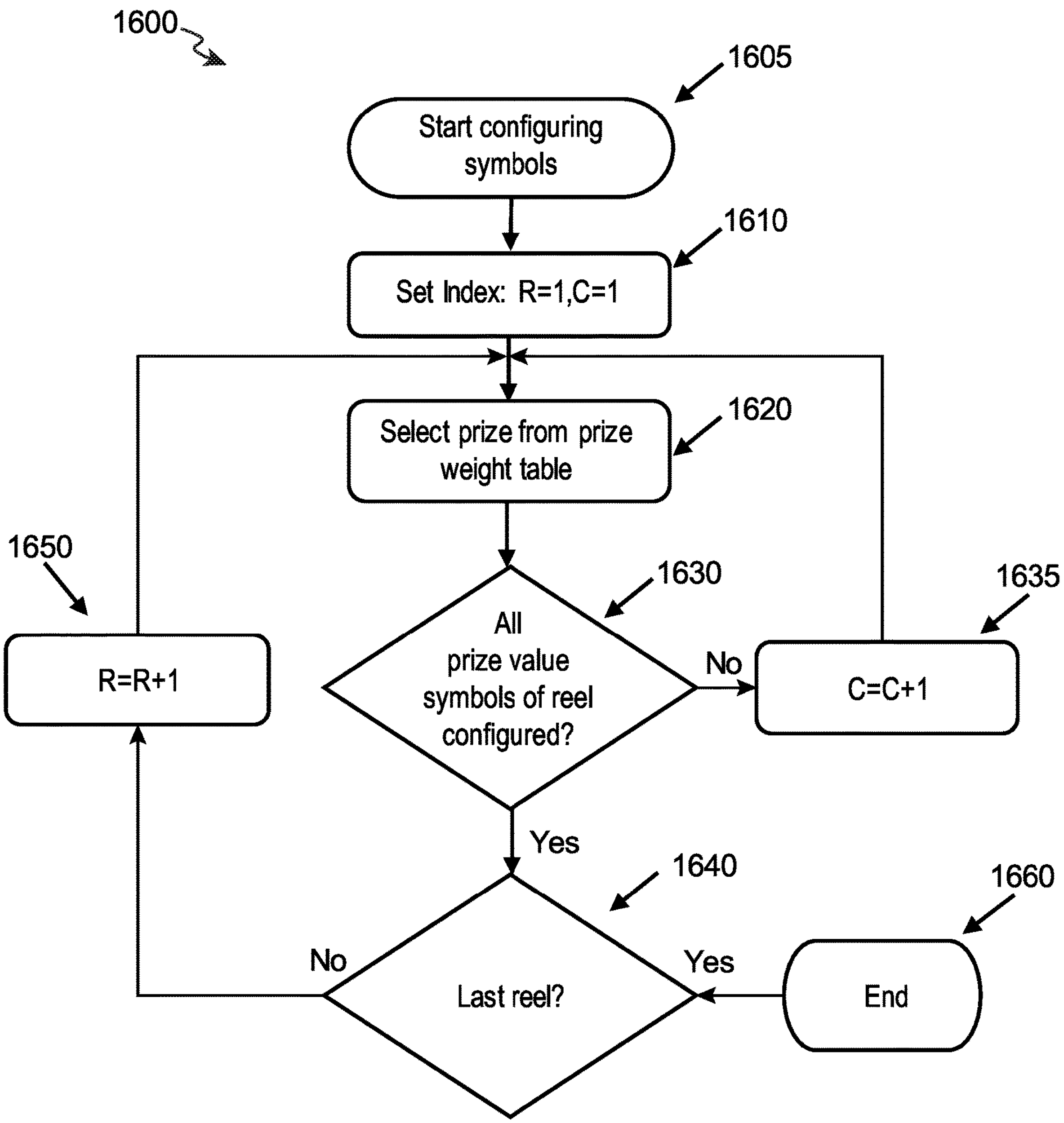
FIG. 16 is a flow chart of a symbol configuration process.

FIG. 16 is an example process 1600 for configuring symbols. At step 1605, the processor 204 starts configuring symbols (e.g. prior to selection step 510). At step 1610, the processor 230 sets an index for implementing the loop by setting R=1, C=1, where R is the current reel strip and C is the current prize value symbol. At step 1620, processor 204 randomly selects a prize from a weight table stored in memory 208 and associated with the current reel strip using a value obtained from random number generator 212 and assigns it to the current prize value symbol. At step 1630, the processor 204 determines if all prize value symbols of a reel strip have been assigned a prize and if not, at step 1635 iterates to the next prize value symbol and thereafter will assign a value to the next prize value symbol at step 1620. If the processor 204 determines at step 1630 that all prize value symbols of a reel strip have been assigned a prize and at step 1640 that this is not the last reel strip the processor then updates the index to the next reel strip at step 1650. Processor 204 then conducts another iterative loop using the weighted table in memory 208 associated with the new current reel to assign values to the prize value symbols of that reel strip. The process continues until it is determined at step 1650 that all reel strips are configured such that the process ends at step 1660.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighbouring reel strip positions are also mapped to the symbol positions of the column. Referring to the example reel strips of FIG. 3, if the value returned by the RNG 212 is mapped to reel position 313, then for the first reel strip 321, "Pic 1" symbol 353 is mapped to a bottom symbol position, "10" symbol 352 is mapped to a middle symbol position, and "Pic 2" symbol 351 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

At step 515, the processor 204 evaluates the selected symbols for winning combinations based on a pay table stored in memory 208. For example, by determining whether there are matching combinations of symbols from left to right along predetermined paylines through the matrix of symbol positions as described above.

At step 520, the processor 204 evaluates whether a trigger condition is met in respect of the base game instance for initiating a series of further game instances. In this example, the trigger condition is that the selected symbols include a threshold number of prize value symbols. In an example, six or more prize value symbols.

Figure 7:
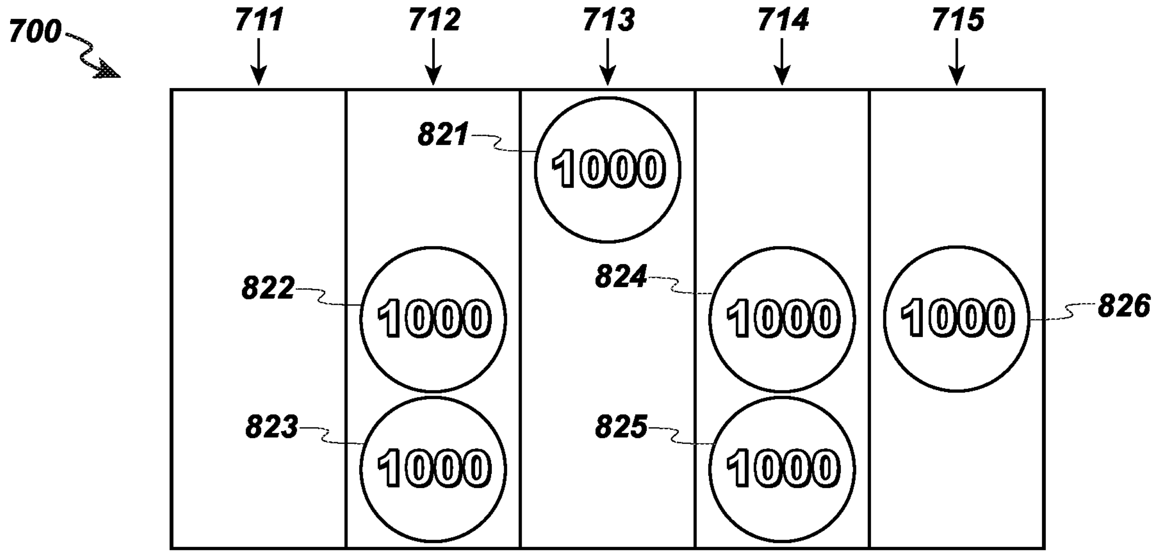
FIGS. 7 to 15 are schematic diagrams illustrating example screen displays of the methods of FIGS. 5 and 6.

In an example, when six or more prize value symbols occur, the processor 204 holds the prize value symbols in place for at least the first game instance of the series of additional game instances (or "free games"). FIG. 7 is an example schematic screen 700 displayed on display 240 of gaming device 200 at the beginning of a series of game instances. In this example, there are five columns 711-715 of three symbol positions. In this example, six prize symbols 821-826 are shown as held from the base game and each has a value of 1000 credits. All other symbols selected in the base game have been removed. In this example, the value of the prize symbols depends on a state of operation of the gaming device 200 and the outcomes of prior game instances. In the example screen displays, all prize symbols have a set value of 1000 credits in each base game and in each free game until a designated symbol is selected by the processor 204 during one of the free games. The set value of the prize symbols is then changed by processor 203 to a new set value as described in further detail below.

At step 530, the processor 204 initiates the series of free games by setting a counter for the series of free games to an initial value (X), for example to three.

At step 535, the processor 204 decrements the counter by one to reflect that a free game to be conducted.

At step 540, the processor 204 selects symbols for the symbol positions not occupied by held prize value symbols. In an example, the processor 204 selects symbols from a set of feature game reel strips, each comprising a mixture of prize value symbols such as those shown in FIG. 3 or blank symbols (i.e. positions not occupied by a prize symbol). In the example at least one of the reel strips also has a designated symbol which may be termed a special symbol. In an example, a single one of the reel strips has a designated symbol. In an example, instead of being associated with individual columns, the reel strips are associated with individual symbol positions and the process of FIG. 4 is modified such that only a single symbol is selected from each reel strip. In one example, there are fifteen reel strips corresponding to the fifteen symbol positions. In an example, the association between the reel strips and symbol positions is randomized. In one example, the processor 204 iterates through the empty symbol positions prior to selecting symbols and randomly selects one of the reel strips to allocate to the symbol position for a current game instance using a value obtained from random number generator 212. In an example where one reel strip has the designated symbol, the processor 204 randomly selects a symbol position to associate with this reel strip prior to randomly selecting reel strips to associate with other symbol positions so that there is always a chance of the designated symbol being selected in a given game instance. It will be appreciated that this process will result in processor 204 assigning varying numbers of reel strips to symbol positions depending on the number of held symbols from a prior game instance.

At step 545, the processor 204 determines whether the selected symbols include a designated symbol. If there is no designated symbol, the processor 204 proceeds to step 550 and determines whether at least one prize value symbol was selected. If not, the processor 204 proceeds to step 555 and determines whether the counter has reached zero. If so, the processor 204 awards the values on the currently shown prize symbol at step 557 and then ends the play of the game at step 595B.

If at step 545, processor 204 determines that there is a designated symbol, processor 204 proceeds to step 580 and sums all the displayed prize value symbols and removes the currently displayed prize symbols from display. At step 585, the processor 204 modifies display of the designated symbol to be a prize value symbol having a prize value corresponding to the total derived at step 580. In other examples, the processor 204 may modify the prize value symbol to represent the sum in some other way. For example, if one of the existing prize symbols carried the prize value "MINI" representing a Mini bonus prize, the modified display of the designated symbol could be "MINI+XXXX", where XXXX represents the sum of the other prize values.

Figure 8:
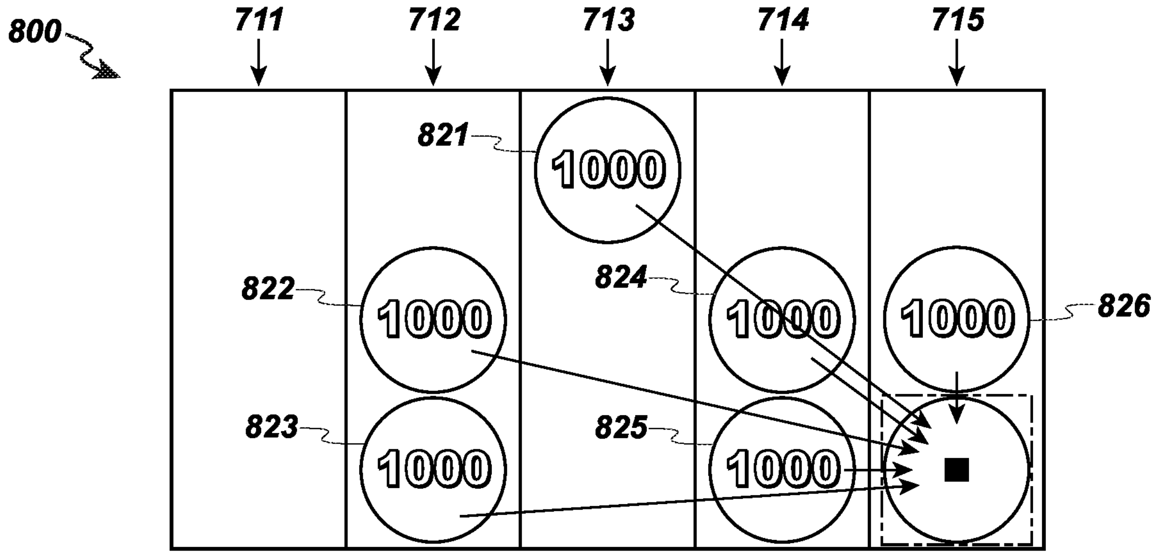
Figure 9:
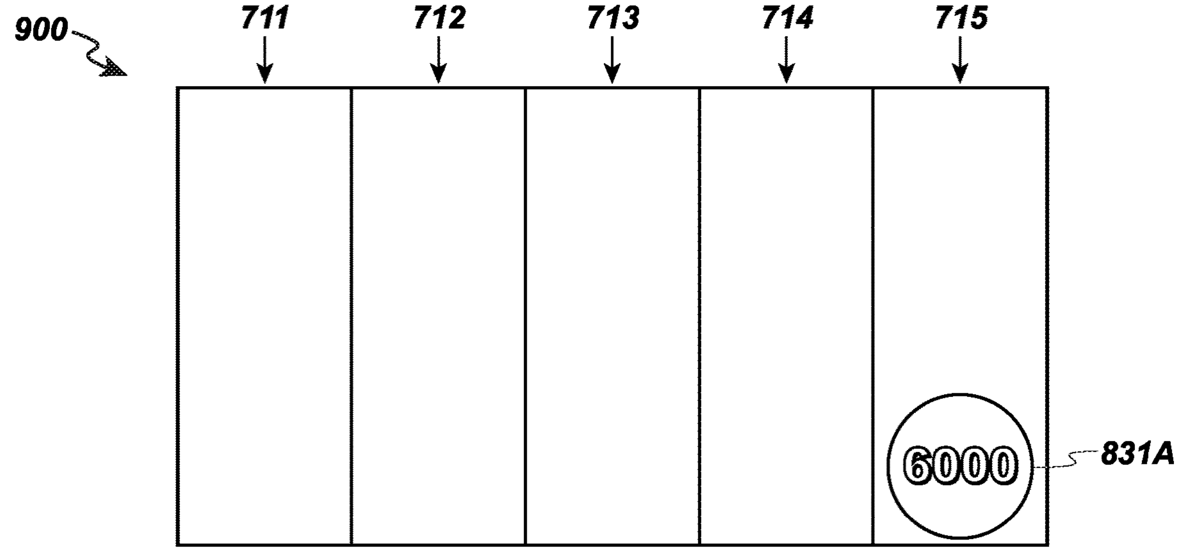

FIGS. 8 and 9 illustrate this process. FIG. 8 is a screen display 800 in a game instance subsequent to the triggering outcome illustrated in FIG. 7. In FIG. 8, a designated symbol 831 in the form of a coin having a square hole in the middle has been selected by processor 204 for the bottom symbol position of the fifth column 715. As illustrated schematically by the arrows in FIG. 8, the values shown on the existing prize symbols 821-826 will be moved to the designated symbol 831. In this case, each of the six prize value symbols 821-826 has a value of 1000 credits resulting in a total of 6000 credits to be added to the designated symbol 831. An animation may accompany the moving of the prize values.

FIG. 9 is a screen display after the step 585 where the designated symbol has been modified 831A to be a prize value symbol having a prize value of 6000 credits and the prize symbols 821-826 that contributed to the prize value have been removed. Advantageously, removal of the prize symbols in 821-826 in this manner by processor 204 makes the symbol positions at which prize symbols 821-826 were located available for selection of a further prize symbol in a subsequent game instance.

In this example, at step 587 the processor 204 updates the prize amounts of all of the prize value symbols on the feature reel strips to correspond to the prize amount shown on the prize value symbol 831A created by modifying display of the designated symbol, in this example to 6000 credits. In other examples, the prize values may remain unchanged, be increased to a new fixed amount, be increased by a multiplier or be selected from a weighted table.

At step 590, the processor 204 holds the prize value symbol 831A for the subsequent game before iterating back to step 530 and resetting the free game counter to the initial value (in this example three games). In other examples, the free game counter may not be reset. For example, the number of free games is fixed and the processor 204 iterates back to step 535 or the number of free games is increased by a fixed amount (e.g. 1 or 2) each time a prize value symbol is selected.

Figure 10:
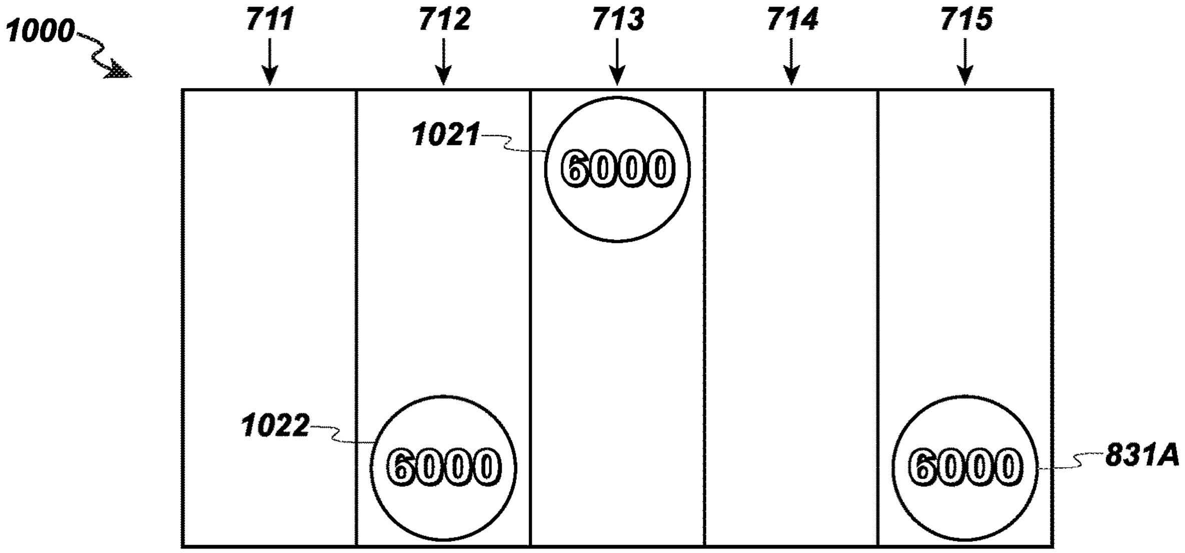

FIG. 10 is a schematic screen display 1000 that illustrates the result of a subsequent symbol selection by the processor 204 at step 540 where two additional prize value symbols 1021,1022 have been selected in addition to held prize value symbol 831A. As a result, at step 545 processor 204 will proceed to step 550 because there is not a designated symbol before determining at step 550 that there is at least one new prize value symbol and hence proceeding to step 552.

At step 552 processor determines whether all symbol positions are occupied by a prize value symbol. As in this case only three symbol positions are occupied, processor 204 proceeds to step 590 and holds the three prize value symbols at their respective symbol positions for a next game instance. Processor 204 then proceeds to step 530 and resets the counter to the initial value as described above.

Figure 11:
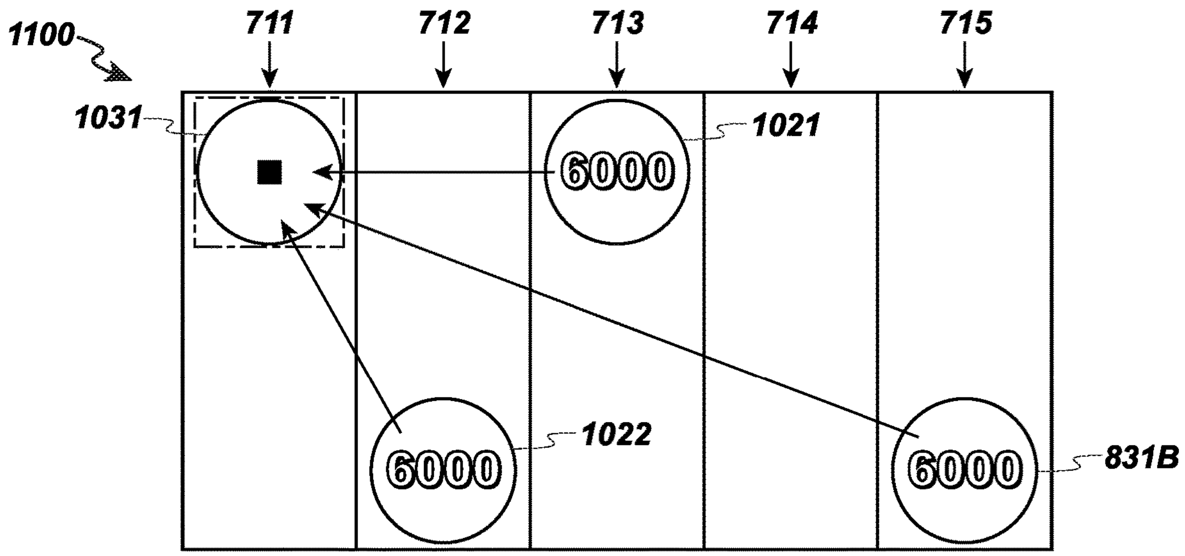

FIG. 11 is a schematic screen display 1100 that illustrates the result of selecting a further designated symbol in a game instance subsequent to that illustrated in FIG. 10.

In FIG. 11, a further designated symbol 1031 has been selected by processor 204 at step 540 for the top symbol position of the first column 711. As illustrated schematically by the arrows in FIG. 11, the values shown on the existing prize symbols will be moved to designated symbol 1031. In this case, each of the three prize value symbols 1021,1022, 831A has a value of 6000 credits resulting in a total of 18000 credits to be added to the designated symbol 1031.

Figure 12:
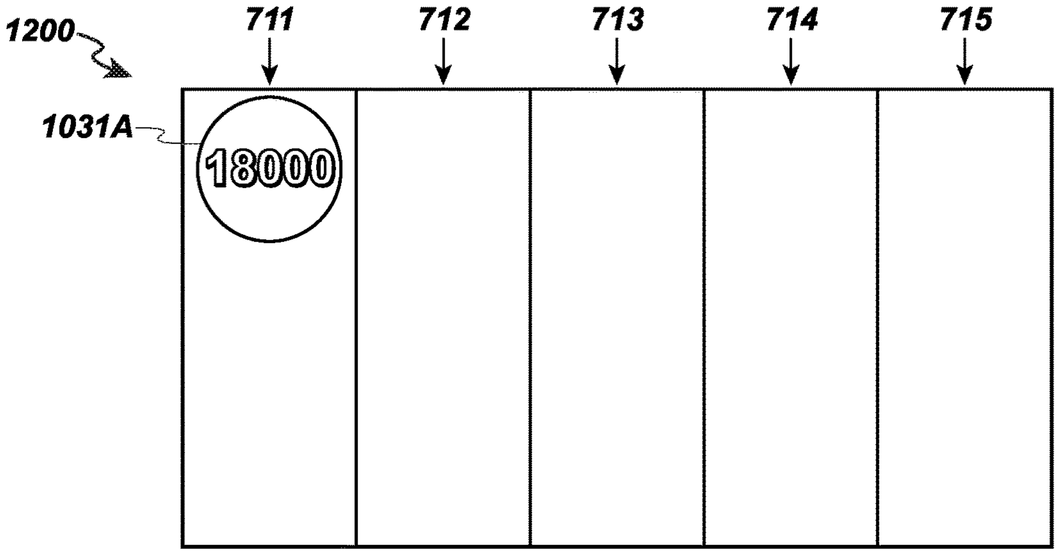

FIG. 12 is a screen display after step 585 where the designated symbol has been modified to be a prize value symbol 1031A to show a prize value of 18000 credits and the prize symbols 1021,1022, 831A that contributed to the prize value have been removed. Again, removal of the prize symbols 1021,1022, 831A in this manner by processor 204 makes the symbol positions at which prize symbols 1021, 1022, 831A were located available for selection of a further prize symbol in a subsequent game instance.

At step 587 the processor 204 updates the prize amounts of all of the prize value symbols on the feature reel strips to correspond to the prize amount shown on the prize value symbol 1031A created by modifying display of the designated symbol, in this example to 18000 credits.

At step 590, the processor 204 holds the prize value symbol 1031A for the subsequent game before iterating back to step 530 and resetting the free game counter to the initial value (in this example three games).

It will be appreciated that the processor 204 will continue to iterate through these loops until (i) it is determined at step 555 that the counter has reached zero, in which case after the total of the currently displayed prize value symbols are awarded at step 557 the process ends at step 595B or (ii) until it is determined at step 552 that all symbol positions occupied. If all symbol positions are occupied, processor 204 proceeds to step 554 and awards a grand jackpot prize which is typically a largest winnable progressive jackpot prize maintained by the gaming device. In this example, after award of the grand jackpot by processor 204, the process proceeds to step 595B and the play of the game ends. In other examples, the process reverts to step 530 (or step 535) after award of the grand jackpot.

In addition to advantageously freeing up symbol display positions while retaining the amounts on prize value symbols, the embodiment provides a mechanism that enables the gaming device 200 to make an award linked to the prize value symbols where an outcome of a base game includes too few prize value symbols to trigger the additional game instances.

As shown in FIG. 5, if at step 520, the processor 204 determines there is not a threshold number of prize value symbols, processor 204 proceeds to step 560 and if there is more than one designated symbol proceeds to step 562 and increments a jackpot meter stored in memory 208.

In this example, the jackpot is a "must win by" or "mystery" jackpot prize. In this form of jackpot, a current prize value is chosen within a defined range by the processor 204. A jackpot meter is then incremented by the processor 204 from a start value and is awarded by the processor 204 when the jackpot meter reaches the set current jackpot value. Conventionally such mystery jackpot meters are increased based on turnover, however, in example embodiments, the jackpot meter is increased responsive to at least one prize symbol being selected but less than the threshold number of prize symbols, thus enabling a prize to be linked to occurrence of the prize symbols when the additional game instances are not triggered.

In one example, a jackpot meter starts at $15,000 (the "start value") and must be won by $15,999.00 (the "end value"). A "set award value" is generated each time the jackpot is won or on start-up where: START VALUE<=SET AWARD VALUE<=END VALUE. The set award value is set by the processor 204 obtaining a random number from random number generator 212 mapping the returned value to the range of possible jackpot values. For example, the processor 204 may determine a current set value of S15, 801.24.

Thus, in this example, the jackpot meter is set in memory 208 so that it starts at $15,000 and is incremented by the processor 204 at step 562 in response to 1 to 5 prize value symbols landing in the base game. If at step 565, the jackpot meter has not reached the current set award value, the play of the game ends at step 595B. When the processor 204 determines at step 565 that the jackpot meter reaches the SET AWARD VALUE (e.g. $15,801.24), then the prize amount is awarded by the processor at step 570 and is reset at step 575 by the processor 204—i.e. a new SET AWARD VALUE is generated by a further random generation process.

In an example embodiment, the amount of the increment to the jackpot meter at step 562 is derived from the values shown on the selected prize symbols, further linking the jackpot prize to the prize value symbols. In one example, the increment amount may be mapped to a currency amount by being a proportion of the amounts shown. For example, if the denomination of the gaming machine is one cent and the total value of the prize value symbols is 3000 credits, this corresponds to a currency amount of $30.00. In an example, the Jackpot increment may be, for example, 2% of the currency amount which is $0.60.

In some embodiments, the prize values for a game may be determined or adjusted based on a held value of a prize symbol, a value of a prize symbol in a prior game or spin, or the like. Generally, the RTP and/or volatility of a game or series of games (for example, a series of games occurring after a set of free games) may be reduced by lowering values of prize value symbols in subsequent games or increased by raising values of prize value symbols in subsequent games. Thus, where the prize value symbol (or held prize value symbol, or summed prize value symbol) in a first series of games has a large value, a processor may assign a lower value to prize value symbols that appear in subsequent games. If the prize value symbol (or held prize value symbol, or summed prize value symbol) in a first series of games is small, then the prize value symbol used in subsequent games may be unchanged or may be assigned a greater value. Thus, for any series of games, the value of a prize value symbol may be determined based on the value of the prize value symbol (or summed prize value symbols) of a prior game or games.

Figure 6:
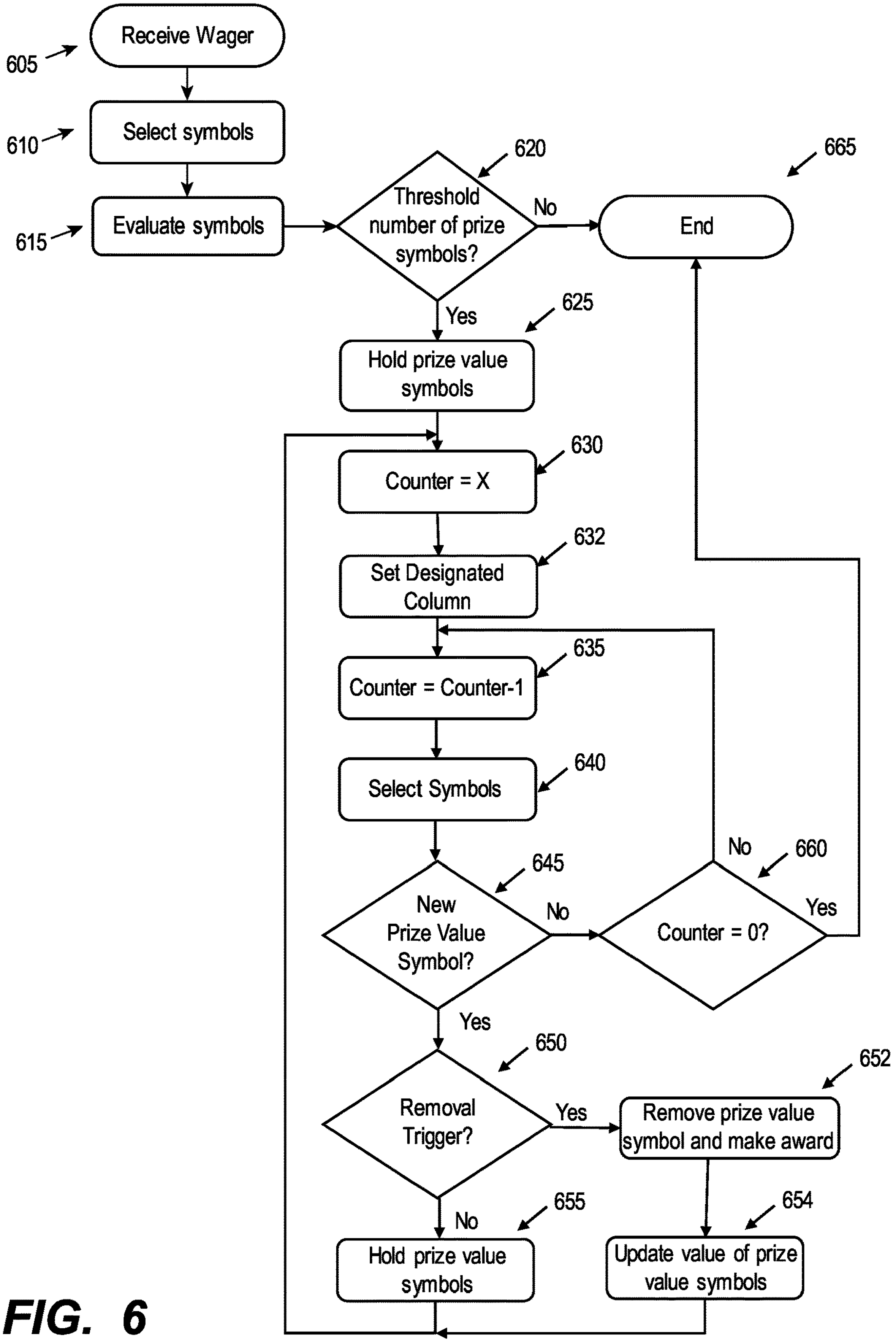
FIG. 6 is a flow chart of another method of operating a gaming device.

An alternative embodiment of a process 600 for operating a gaming device is shown in FIG. 6. At step 605, the processor 204 receives a wager. For example, input using one of the input devices described above.

At step 610, the processor 204 selects symbols for a base game instance, for example using the symbol selection process described in relation to FIGS. 3 and 4 above.

As described in relation to FIG. 5 above, in some examples, the prize value symbols (in this example, the COR or "Cash on Reels" symbols) are configured in each base game instance by assigning prize values from a weighted table using the process described in relation to FIG. 16 above.

At step 615, the processor 204 evaluates the selected symbols for winning combinations based on a pay table stored in memory 208. For example, by determining whether there are matching combinations of symbols from left to right along predetermined paylines through the matrix of symbol positions as described above.

At step 620, the processor 204 evaluates whether a trigger condition is met by the base game instance for initiating a series of further game instances. In this example, the trigger condition is that the selected symbols include a threshold number of prize value symbols. In an example, five or more prize value symbols.

Figure 13:
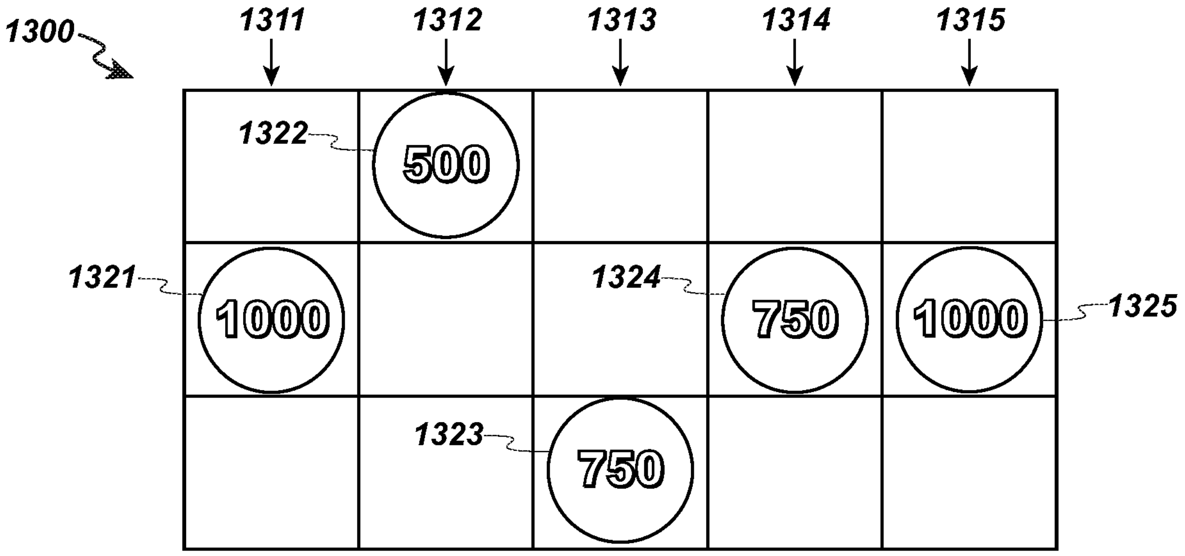

In an example, when five or more prize value symbols occur, the processor 204 holds the prize value symbols in place for at least the first game instance of the series of additional game instances (or "free games"). FIG. 13 is an example schematic screen 1300 displayed on screen 240 of gaming device 200 at the beginning of a series of game instances. In this example, there are five columns 1311-1315 of three symbol positions. In this example, five prize symbols 1321-1325 are shown as held from the base game which have a variety of values assigned from a weighted table value. All other symbols selected in the base game have been removed.

At step 630, the processor 204 initiates the series of free games by setting a counter for the series of free games to an initial value (X), for example to three.

In this example, at step 632 the processor sets one of the columns of symbol positions as a designated column. In this example, the designated column enables the processor 204 to subsequently assess the removal trigger at step 650. In examples with other removal triggers, this step is not necessary or may be replaced by another step. In this example, the processor 204 sets the column by randomly selecting one of the columns without replacement (i.e. so that each column can only be selected once) using a value obtained from RNG 212. In this example, once each column has been the designated column, the processor will not select a further column. In other examples, the columns may be set in a defined order. In other examples, the columns may be selected entirely randomly such that the same column may be selected twice or after all columns have been selected, a column may be selected for a second time.

At step 635, the processor 204 decrements the counter by one.

At step 640, the processor 204 selects symbols for the symbol positions not occupied by held prize value symbols. In an example, the processor 204 selects symbols from a set of feature game reel strips, each comprising a mixture of prize value symbols such as those shown in FIG. 3 and blank symbols (i.e. positions not occupied by a prize symbol). In an example, instead of being associated with individual columns, the reel strips are associated with individual symbol positions and the process of FIG. 4 is modified such that only a single symbol is selected from each reel strip. In one example, there are fifteen reel strips corresponding to the fifteen symbol positions. In an example, the association between the reel strips and symbol positions is randomized. In one example, the processor 204 iterates through the empty symbol positions prior to selecting symbols and randomly selects one of the reel strips to allocate to the symbol position for a current game instance using a value obtained from random number generator 212. It will be appreciated that this process will result in processor 204 assigning varying numbers of reel strips to symbol positions depending on the number of held symbols from a prior game instance. In the example screen displays below immediately after the free games are triggered all prize symbols have a set value of 2000 credits but this value changes when a removal condition is met as described below.

At step 645, the processor 204 determines whether the selected symbols include a prize value symbol. If there is no prize value symbol, the processor 204 proceeds to step 660 and determines whether the counter has reached zero. If so, the processor 204 ends the play of the game at step 665.

If the counter is non-zero at step 660, the processor 204 reverts to step 635 and decrements the counter by one before proceeding to select a further set of symbols at step 640.

When it is determined at step 645 that there is at least one new prize value symbol, the processor proceeds to step 650 and determines whether a removal trigger is satisfied. If a removal trigger is not satisfied, the new prize value symbols are retained by processor 204 at step 655 for at least the next game instance and the process reverts to step 640, where the counter is reset to the initial value.

When a removal condition is met at step 650, the processor 204 proceeds to step 652 and removes at least those prize value symbols that satisfy the removal condition. Thus, as in the embodiment described in relation to FIG. 5 additional symbol positions will become available for a subsequent game round. In this embodiment, the prize value symbols will be retained on the screen for at least one game instance before being removed. This is also the case in the example given in connection with the first embodiment. In other examples, a different trigger is used or the triggering symbols are not held from the base game. It will also be appreciated that the presence of a designated symbol in the example of FIG. 5 is a removal condition.

Figure 14:
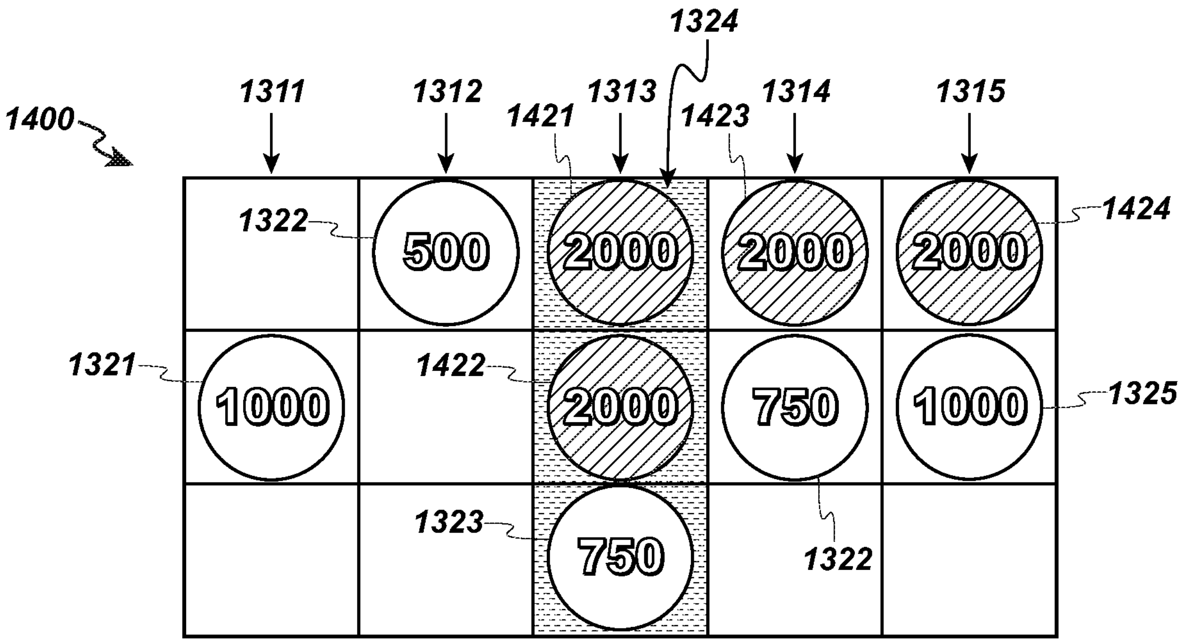

FIG. 14 is an example schematic screen display 1400 of a designated condition being met. In this example, the designated column is middle column 1313. A background 1324 of the middle column (e.g. the colour) is changed to indicate that it is designated. In this example, the removal condition is that all symbol positions of the designated column are occupied by a prize value symbol. In this example, two prize value symbols 1421,1422 of 2000 credits 1421,1422 have been added to the designated column and two prize value symbols 1423,1424 are added in other columns. In this example, prize value symbols 1421,1422 and 132 will be removed and an award made of the values shown on the removed symbols by adding the values to a win meter in memory 208.

At step 654 the processor 204 updates the values shown on the prize value symbols that are not triggering prize symbols (i.e. retained from the base game). In an example, the value changes from 2000 credits to 4000 credits). In this example, this process updates both the prize values for new symbols and the prize values for any non-removed prize symbols selected during the free games. In another example, prize values of a displayed prize value symbol do not change after a prize value symbol is displayed.

Processor 204 then iterates back to step 630 and re-initializes the counter.

Figure 15:
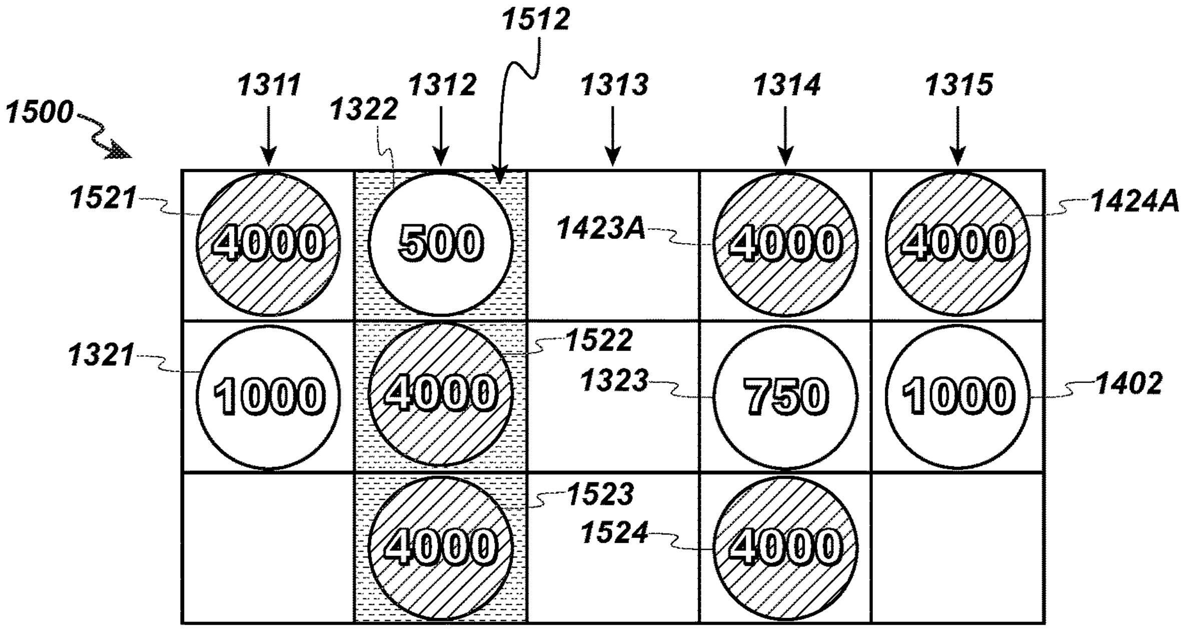

FIG. 15 shows an example of a screen display 1500 after a subsequent iteration. As shown in FIG. 15, the second column 1313 is now the designated column and has a modified background 1512. Modified prize value symbols 1423A and 1424A are retained from the earlier game instance but now have a prize value of 4000 credits. New prize value symbols 1521-1524 have been selected. In this example, at step 650 the processor 204 will determine that a removal condition is met and at step 652 will remove prize symbols 1322, 1522 and 1523 and make an award of 8500 credits. While the fourth column 1314 is currently completely full, the column is not designated and hence the prize value symbols will not be removed by the processor.

EXAMPLE EMBODIMENTS

In an example embodiment, there is provided a gaming device comprising:

a display;

a processor; and a memory storing (a) reel strip data defining a set of reel strips, each reel of the set of reel strips comprising prize value symbols and non-prize value symbols, and (b) instructions which when executed by the processor, cause the processor to:

initiate a series of game instances in response to a threshold number of prize value symbols occurring in a base game instance;

hold respective ones of the prize symbols at respective symbol positions of a plurality of columns of symbol positions at which the respective prize symbols occurred in the base game instance, for at least a first game instance of the series of game instances; and in each of the series of game instances:

control the display to display the plurality of columns of symbol positions including by displaying any prize value symbols held from a prior game instance, select a symbol from the set of reel strips for each symbol position not occupied by a held prize value symbol;

control the display to display the newly selected symbols at their respective symbol positions in conjunction with any held prize value symbols;

upon a removal condition being met, remove at least one of the prize value symbols for a next game instance; and hold any non-removed prize value symbols for the next game instance.

In an embodiment, the removal condition comprises all symbol positions of a designated column being occupied by a prize value symbol, and removing at least one prize value comprises removing at least the prize value symbols of the designated column from the display to thereby enable symbols to be selected for their respective symbol positions in a next game round.

In an embodiment, when the instructions are executed by the processor, they cause the processor to make an award comprising at least the prize values of the removed prize value symbols.

In an embodiment, when the instructions are executed by the processor, they cause the processor to select the designated column from among the plurality of columns in response to the trigger condition being met.

In an embodiment, when the instructions are executed by the processor, they cause the processor to select a new designated column from among previously unselected ones of the plurality of columns for the next game round in response to all symbol positions of a designated column being occupied by a prize value symbol.

In an embodiment, the set of reel strips is a feature game set of reel strips and a base game set of reel strips is used for the base game instance.

In an embodiment, the base game set of reel strips comprises a reel strip for each of the plurality of columns.

In an embodiment, when the instructions are executed by the processor, they cause the processor to assign prize values to each prize value symbol for a current game instance from a weighted table of prize values.

In an embodiment, when the instructions are executed by the processor, they cause the processor to set the value of each prize symbol of the feature set of reel strips to a first prize value in a first game instance of the plurality of game instances.

In an embodiment, when the instructions are executed by the processor, they cause the processor to remove all of the existing prize symbols in response to selection of a designated symbol, modify the designated symbol to be a new prize value symbol having a total value derived from the removed existing prize value symbols, and retain the new prize symbol for the next game instance.

In an example embodiment, there is provided a method of operating a gaming device comprising a display, and a memory storing reel strip data defining a set of reel strips, each reel of the set of reel strips comprising prize value symbols and non-prize value symbols, the method comprising:

initiating a series of game instances in response to a threshold number of prize value symbols occurring in a base game instance;

holding respective ones of the prize symbols at respective symbol positions of a plurality of columns of symbol positions at which the respective prize symbols occurred in the base game instance, for at least a first game instance of the series of game instances; and in each of the series of game instances:

controlling the display to display the plurality of columns of symbol positions including by displaying any prize value symbols held from a prior game instance, selecting a symbol from the set of reel strips for each symbol position not occupied by a held prize value symbol;

controlling the display to display the newly selected symbols at their respective symbol positions in conjunction with any held prize value symbols;

upon a removal condition being met, removing at least one of the prize value symbols for a next game instance; and holding any non-removed prize value symbols for the next game instance.

In an example embodiment, there is provided a system comprising:

one or more processors; and at least one memory storing (a) reel strip data defining a set of reel strips, each reel of the set of reel strips comprising prize value symbols and non-prize value symbols, and (b) instructions which when executed by the one or more processors, cause the one or more processors to:

initiate a series of game instances in response to a threshold number of prize value symbols occurring in a base game instance;

hold respective ones of the prize symbols at respective symbol positions of a plurality of columns of symbol positions at which the respective prize symbols occurred in the base game instance, for at least a first game instance of the series of game instances; and in each of the series of game instances:

control the display to display the plurality of columns of symbol positions including by displaying any prize value symbols held from a prior game instance, select a symbol from the set of reel strips for each symbol position not occupied by a held prize value symbol;

control the display to display the newly selected symbols at their respective symbol positions in conjunction with any held prize value symbols;

upon a removal condition being met, remove at least one of the prize value symbols for a next game instance; and hold any non-removed prize value symbols for the next game instance.

In an example embodiment, there is provided a gaming device comprising:

a display;

a processor; and a memory storing (a) reel strip data defining a set of reel strips, each reel of the set of reel strips comprising prize value symbols and non-prize value symbols, and (b) instructions which when executed by the processor, cause the processor to, in each of a series of game instances:

control the display to display a plurality of columns of symbol positions including by displaying any prize value symbols held from a prior game instance;

select a symbol from the set of reel strips for each symbol position not occupied by a held prize value symbol;

control the display to display the newly selected symbols at their respective symbol positions in conjunction with any held prize value symbols; and upon all symbol positions of a designated column being occupied by a prize value symbol, remove at least the prize value symbols of the designated column from the display to thereby enable symbols to be selected for their respective symbol positions in the next game instance, and make an award comprising at least the prize values of the removed prize value symbols.

In an embodiment, when the instructions are executed by the processor, they cause the processor to initiate the series of game instances in response to a trigger condition being met in a base game instance.

In an embodiment, when the instructions are executed by the processor, they cause the processor to select the designated column from among the plurality of columns in response to the trigger condition being met.

In an embodiment, when the instructions are executed by the processor, they cause the processor to select a new designated column from among previously unselected ones of the plurality of columns for the next game round in response to all symbol positions of a designated column being occupied by a prize value symbol.

In an embodiment, the trigger condition comprises selection of a threshold number of prize value symbols.

In an embodiment, when the instructions are executed by the processor, they cause the processor to hold the prize value symbols that met the trigger condition for at least a first game instance of the series of game instances.

In an embodiment, the set of reel strips is a feature game set of reel strips and a base game set of reel strips is used for the base game instance.

In an embodiment, the symbol positions are arranged in a plurality of columns of symbol positions and the base game set of reel strips comprises a reel strip for each of the plurality of columns.

In an embodiment, when the instructions are executed by the processor, they cause the processor to assign prize values to each prize value symbol for a current game instance from a weighted table of prize values.

In an embodiment, when the instructions are executed by the processor, they cause the processor to set the value of each prize symbol of the feature set of reel strips to a first prize value in a first game instance of the plurality of game instances.

In another example embodiment, there is provided a method of operating a gaming device comprising a display, and a memory storing reel strip data defining a set of reel strips, each reel of the set of reel strips comprising prize value symbols and non-prize value symbols, the method comprising, in each of a series of game instances:

controlling the display to display a plurality of columns of symbol positions including by displaying any prize value symbols held from a prior game instance;

selecting a symbol from the set of reel strips for each symbol position not occupied by a held prize value symbol;

controlling the display to display the newly selected symbols at their respective symbol positions in conjunction with any held prize value symbols; and upon all symbol positions of a designated column being occupied by a prize value symbol, making an award comprising at least the prize values of the prize value symbols, and removing at least the prize value symbols of the designated column from the display to thereby enable symbols to be selected for their respective symbol positions in the next game instance.

In another example embodiment, there is provided a system comprising:

one or more processors; and at least one memory storing (a) reel strip data defining a set of reel strips, each reel of the set of reel strips comprising prize value symbols and non-prize value symbols, and (b) instructions which when executed by the one or more processors, cause the one or more processors to, in each of a series of game instances:

control a display to display a plurality of columns of symbol positions including by displaying any prize value symbols held from a prior game instance;

select a symbol from the set of reel strips for each symbol position not occupied by a held prize value symbol;

control the display to display the newly selected symbols at their respective symbol positions in conjunction with any held prize value symbols; and upon all symbol positions of a designated column being occupied by a prize value symbol, make an award comprising at least the prize values of the prize value symbols, and removing at least the prize value symbols of the designated column from the display to thereby enable symbols to be selected for their respective symbol positions in the next game instance.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device comprising:

a display;

a processor; and a memory storing (a) reel strip data defining a set of reel strips, each reel strip of the set of reel strips comprising prize value symbols and non-prize value symbols, wherein at least one reel strip of the set of reel strips comprises a designated symbol and (b) instructions which when executed by the processor, cause the processor to, in each of a series of game instances:

control the display to display a plurality of symbol positions including by displaying any prize value symbols held from a prior game instance;

control the display to display a symbol from the set of reel strips for each symbol position not occupied by a held prize value symbol;

control the display to display newly selected symbols at respective symbol positions in conjunction with any held prize value symbols;

upon the displayed newly selected symbols including the designated symbol:

modify display of the designated symbol to be a new prize value symbol representing a sum of any currently displayed prize symbols and to be held for at least a next game instance; and remove the any currently displayed prize symbols;

control the display to display, at an end of the series of game instances, an award of at least prize values represented by each designated symbol; and remove each other prize value symbol from the display upon occurrence of a removal condition to thereby enable symbols to be selected for symbol positions at which they were displayed in the at least the next game instance.

2. The gaming device as claimed in claim 1, wherein the processor is further operative to control a return to player by establishing a threshold number of prize value symbols at or above which a jackpot is awarded.

3. The gaming device as claimed in claim 1, wherein, when the instructions are executed by the processor, the processor initiates the series of game instances in response to a selection of a threshold number of prize value symbols in a base game instance.

4. The gaming device as claimed in claim 3, wherein, when the instructions are executed by the processor, the processor holds the prize value symbols that met a trigger condition for at least a first game instance of the series of game instances.

5. The gaming device as claimed in claim 3, wherein:

the set of reel strips is a feature game set of reel strips;

a base game set of reel strips is used for the base game instance;

the symbol positions are arranged in a plurality of columns of symbol positions;

the base game set of reel strips comprises a reel strip for each of the plurality of columns; and the processor assigns prize values to each prize value symbol of the base game set of reel strips for a current base game instance from a weighted table of prize values.

6. The gaming device as claimed in claim 1, wherein, when the instructions are executed by the processor, the processor sets a value of each prize symbol of a feature set of reel strips to a first prize value in a first game instance of a plurality of game instances.

7. A non-transitory computer-readable medium containing instructions which, when executed by a processor of an electronic gaming machine, cause the processor to, in each of a series of game instances:

control a display to display a plurality of symbol positions including by displaying any prize value symbols held from a prior game instance;

control the display to display a symbol from a set of reel strips for each symbol position not occupied by a held prize value symbol;

control the display to display newly selected symbols at respective symbol positions in conjunction with any held prize value symbols;

upon the displayed newly selected symbols including a designated symbol:

modify display of the designated symbol to be a new prize value symbol representing a sum of any currently displayed prize symbols and to be held for at least a next game instance; and remove the any currently displayed prize symbols;

control the display to display, at an end of a series of game instances, an award of at least prize values represented by each designated symbol; and after awarding the at least the prize values, select a new value for the new prize value symbol to be used in a subsequent game instance, the new value dependent on at least one of:

a value of the held prize value symbol; or a value of the new prize value symbol.

8. The non-transitory computer-readable medium of claim 7, wherein the subsequent game instance occurs after a set of free games terminates.

9. A method of operating a gaming device comprising a display, a processor, and a memory storing (a) reel strip data defining a set of reel strips, each reel of the set of reel strips comprising prize value symbols and non-prize value symbols and 101 at least one reel strip of the set of reel strips comprising a designated symbol, the method comprising, in each of a series of game instances:

controlling the display to display a plurality of symbol positions including by displaying any prize value symbols held from a prior game instance, controlling the display to display a symbol from the set of reel strips for each symbol position not occupied by a held prize value symbol, controlling the display to display newly selected symbols at respective symbol positions in conjunction with any held prize value symbols, and upon the displayed newly selected symbols including the designated symbol:

modifying display of the designated symbol to be a new prize value symbol representing a sum of currently displayed prize symbols that are held for at least a next game instance; and removing the currently displayed prize symbols;

removing each prize value symbol from the display upon occurrence of a removal condition to thereby enable symbols to be selected for symbol positions at which they were displayed in the at least the next game instance; and controlling the display to display, at an end of the series of game instances, an award of at least prize values represented by each designated symbol.

10. The method as claimed in claim 9, further comprising initiating the series of game instances in response to a trigger condition being met in a base game instance.

11. The method as claimed in claim 10, wherein the trigger condition comprises selection of a threshold number of prize value symbols during the operation of selecting the symbol from each of the set of reel strips for each symbol position not occupied by the held prize value symbol.

12. The method as claimed in claim 11, wherein, when the instructions are executed by the processor, the processor holds prize value symbols that met the trigger condition for at least a first game instance of the series of game instances.

13. The method as claimed in claim 10, wherein:

the set of reel strips is a feature game set of reel strips; and a base game set of reel strips is used for the base game instance.

14. The method as claimed in claim 13, wherein:

the symbol positions are arranged in a plurality of columns of symbol positions; and the base game set of reel strips comprises a reel strip for each of the plurality of columns.

15. The method as claimed in claim 14, further comprising assigning prize values to each prize value symbol of the base game set of reel strips for a current base game instance from a weighted table of prize values.

16. The method as claimed in claim 13, further comprising setting a value of each prize symbol of the feature game set of reel strips to a first prize value in a first game instance of a plurality of game instances.

17. The method as claimed in claim 16, further comprising setting the value of each prize symbol of the feature game set of reel strips to a new prize value in a next game instance of the plurality of game instances following displayed symbols including the designated symbol.

18. The method as claimed in claim 17, wherein the new prize value is dependent on the sum of currently displayed prize symbols.

19. The gaming device as claimed in claim 1, wherein one of the any currently displayed prize symbols includes a word.

20. The gaming device as claimed in claim 19, wherein:

the sum is a first sum; and the new prize value symbol includes the word plus a second sum of others of the any currently displayed prize symbols.

* * * * *